(12) United States Patent
Hsieh et al.

(10) Patent No.: US 9,674,077 B2
(45) Date of Patent: Jun. 6, 2017

(54) VEHICULAR COMMUNICATION SYSTEM AND ROUTING METHOD THEREOF

(71) Applicant: National Chiao Tung University, Hsinchu (TW)

(72) Inventors: Yi-Ling Hsieh, Hsinchu (TW); Kuo-Chen Wang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 731 days.

(21) Appl. No.: 14/044,881

(22) Filed: Oct. 3, 2013

(65) Prior Publication Data
US 2015/0098329 A1 Apr. 9, 2015

(51) Int. Cl.
*H04L 12/725* (2013.01)
*H04L 12/707* (2013.01)
*H04L 12/721* (2013.01)
*H04L 12/751* (2013.01)
*H04L 12/741* (2013.01)

(52) U.S. Cl.
CPC ............ *H04L 45/24* (2013.01); *H04L 45/302* (2013.01); *H04L 45/08* (2013.01); *H04L 45/14* (2013.01); *H04L 45/74* (2013.01)

(58) Field of Classification Search
None
See application file for complete search history.

(56) References Cited

U.S. PATENT DOCUMENTS 8,270,347 B2 * 9/2012 Senouci ................. H04L 45/06
370/278

2004/0218548 A1 * 11/2004 Kennedy ................ H04L 1/1685
370/254
2004/0218582 A1 * 11/2004 Kennedy ................. H04L 45/22
370/351
2004/0219909 A1 * 11/2004 Kennedy ................. H04L 45/14
455/422.1
2008/0002574 A1 * 1/2008 Mosko ..................... H04L 43/08
370/229

(Continued)

FOREIGN PATENT DOCUMENTS

TW     I226199      1/2005

OTHER PUBLICATIONS

Hsieh et al.—A Road-based QoS-aware Multipath Routing for Urban Vehicular Ad Hoc Networks—2012.*

(Continued)

*Primary Examiner* — Christopher Wyllie
(74) *Attorney, Agent, or Firm* — Jianq Chyun IP Office

(57) ABSTRACT

The invention discloses a vehicular communication system and a routing method thereof. The routing method includes the following steps. When a first relay node of the relay nodes, which locates in a last road slot of each of the road section, receives the route reply packet, the first relay node is configured to obtain a plurality of moving traces of a plurality of specific relay nodes according to the route reply packet; estimate at least one connection life period related to a plurality of specific road slots according to the moving traces; estimate at least one connection available interval of the specific road section according to the at least one connection life period; and append the at least one connection available interval to the route reply packet and forward the route reply packet.

18 Claims, 6 Drawing Sheets

(56) References Cited

U.S. PATENT DOCUMENTS

| | | | |
|---|---|---|---|
| 2008/0080520 A1* | 4/2008 | Westphal | H04L 45/00 370/400 |
| 2012/0106453 A1* | 5/2012 | Li | H04L 45/121 370/328 |
| 2015/0098329 A1* | 4/2015 | Hsieh | H04L 45/24 370/235 |

OTHER PUBLICATIONS

Institutional Repository of NCTU showing Issed date of Hsieh et al.—A Road-based QoS-aware Multipath Routing for Urban Vehicular Ad Hoc Networks ad Jan. 1, 2012.*
Eiza et al. (Investigation of routing reliability of vehicular ad hoc networks—Jul. 1, 2013).*
J. Nzouonta et al., "VANET Routing on City Roads Using Real-Time Vehicular Traffic Information," IEEE Transactions on Vehicular Technology, vol. 58, No. 7, Sep. 2009, pp. 3609-3626.
H. Saleet et al., "Intersection-Based Geographical Routing Protocol for VANETs: A Proposal and Analysis," IEEE Transactions on Vehicular Technology, vol. 60, No. 9, Nov. 2011, pp. 4560-4574.
Yi-Ling Hsieh and Kuochen Wang, "A Road-based QoS-aware Multipath Routing for Urban Vehicular Ad Hoc Networks," IEEE Global Communications Conference (GLOBECOM), Dec. 3-7, 2012, pp. 189-194.

* cited by examiner

VEHICULAR COMMUNICATION SYSTEM AND ROUTING METHOD THEREOF

BACKGROUND

Field of the Invention

The invention relates to a communication system and a routing method thereof, in particular, to a vehicular communication system and a routing method thereof.

Description of Related Art

Traditional routing protocols in vehicular ad hoc networks (VANETs) are node-based, while to adapt to urban VANETs, most of recent routing protocols are road-based. In node-based routing protocols, a path is composed of nodes, and packets are relayed along the determined sequence of nodes. However, due to high mobility in VANETs, nodes move apart from each other rapidly. The physical link of consecutive relay nodes easily gets broken so that route failures occur frequently in node-based routing protocols. Frequent rout failures result in packet loss and increase control overhead of route recovery. As a result, road-based routing protocols were proposed to improve route stability. That is, a path consists of a succession of road sections from source to destination, and data packets are transferred along the road sections. With each road sections, geographical forwarding is used. As long as nodes are dense enough in each road section of a path, the whole path is connected. In urban VANETs, node density in a road section does not vary too much, in a short period. Therefore, road-based routing is steadier than node-based routing. To further enhance route stability, multipath routing provides alternative routes immediately once the current route fails, or provides concurrent transmission with multiple paths. However, existing multipath routing approaches are node-based routing protocols. So they still inherit the drawback of node-based routing protocols that nodes move apart from each other rapidly.

SUMMARY

Accordingly, the present invention is directed to a vehicular communication system and a routing method thereof.

A vehicular communication system is introduced herein. The vehicular communication system includes a source node, a plurality of relay nodes and a destination node. When the source node wants to communicate with the destination node, the source node sends a route request packet to find at least one transmission path to the destination node, wherein each of the transmission path comprises at least one road section, and each of the road section comprises at least one road slot. After receiving the route request packet, each of the relay nodes relay the route request packet to the destination node. After receiving the route request packet, the destination node sends a route reply packet to the source node through the relay nodes locating on the at least one transmission path. When a first relay node of the relay nodes, which locates in a last road slot of each of the road section, receives the route reply packet, the first relay node is configured to obtain a plurality of moving traces of a plurality of specific relay nodes according to the route reply packet. The specific relay nodes comprises the relay nodes currently locating in a specific road section, and the specific road section is the road section that the route reply packet currently reaches. Next, the first relay estimates at least one connection life period related to a plurality of specific road slots according to the moving traces. The specific road slots are the road slots within the specific road section. Afterwards, the first relay node estimates at least one connection available interval of the specific road section according to the at least one connection life period. Subsequently, the first relay node appends the at least one connection available interval to the route reply packet and forward the route reply packet. The last road slot is the road slot that the route reply packet lastly reaches in each of the road sections while being relayed to the source node.

In one embodiment of the present invention, the route request packet comprises a source field, a destination field, a packet sequence number and a road section list, wherein the source field is related to the source node, the destination field is related to the destination node. After receiving the route request packet, each of the relay nodes is configured to determine whether the route request packet has been previously processed by checking the packet sequence number in a route request table. If yes, the first relay node ignores the route request packet; if no, the first relay node records the packet sequence number in the route request table and determines whether the road section list comprises the road section that the route request packet currently reaches. If yes, the first relay node geographically forwards the route request packet; if no, the first relay node updates the route request packet by appending the road section that the route request packet currently reaches into the road section list and geographically forwards the route request packet.

In one embodiment of the present invention, each of the relay nodes has a neighbour table configured to record a coordinate, a speed and a moving direction of neighbouring relay nodes. When a second relay node other than the first relay node of the specific relay nodes receives the route reply packet, the second relay node updates the route reply packet by appending its neighbour table, and forwards the route reply packet.

In one embodiment of the present invention, the first relay node obtains the moving traces of the specific relay nodes according to the neighbour table corresponding to each of the specific relay nodes.

In one embodiment of the present invention, the first relay node is further configured to remove the neighbour table, which corresponds to each of the specific relay nodes, contained in the route reply packet after estimating the at least one connection available interval of the specific road section. Next, the first relay node appends the neighbour table of the first relay node to the route reply packet.

In one embodiment of the present invention, each of the relay nodes periodically broadcasts a hello message to the neighbouring relay nodes. The hello message comprises the coordinate, the speed and the moving direction of the relay node that sends the hello message, and the neighbouring relay nodes are the relay nodes within a transmission range of the relay node that sends the hello message. After receiving the hello message, each of the relay nodes updates its neighbour table according to the received hello message.

In one embodiment of the present invention, the first relay node maps the moving traces of the specific relay nodes into a space-time planar graph, wherein an X-axis of the space-time planar graph is a time axis and a Y-axis of the space-time planar graph corresponds to the specific road slots. The first relay node estimates a plurality of staying intervals that the specific relay nodes stay in each of the specific road slots. For each of the specific road slots, the first relay node projects the corresponding staying intervals to the time axis to find the at least one connection life period related to the specific road slots.

In one embodiment of the present invention, the first relay node intersects the at least one connection life period to estimate at least one connection available interval of the specific road section.

In one embodiment of the present invention, after receiving the route reply packet, the source node dynamically switches to the at least one transmission path for transmitting data packets according to the at least one connection available interval comprised in the received route reply packet.

In one embodiment of the present invention, the destination node periodically sends a route update packet for checking whether the at least one transmission path is valid, and if the at least one transmission path is invalid, the source node re-sends the route request packet to the destination node through the relay nodes for refreshing the at least one transmission path.

A routing method adapted to a vehicular communication system that comprises a source node, a plurality of relay nodes and a destination node is introduced herein. The routing method includes the following steps. When the source node wants to communicate with the destination node, the source node sends a route request packet to find at least one transmission path to the destination node, wherein each of the transmission path comprises at least one road section, and each of the road section comprises at least one road slot. After receiving the route request packet, each of the relay nodes relay the route request packet to the destination node. After receiving the route request packet, the destination node sends a route reply packet to the source node through the relay nodes locating on the at least one transmission path. When a first relay node of the relay nodes, which locates in a last road slot of each of the road sections, receives the route reply packet, the first relay node is configured to obtain a plurality of moving traces of a plurality of specific relay nodes according to the route reply packet. The specific relay nodes comprise the relay nodes currently locating in a specific road section, and the specific road section is the road section that the route reply packet currently reaches. Afterwards, the first relay node estimates at least one connection life period related to a plurality of specific road slots according to the moving traces. The specific road slots are the road slots within the specific road section. Next, the first relay node estimates at least one connection available interval of the specific road section according to the at least one connection life period. Subsequently, the first relay node appends the at least one connection available interval to the route reply packet and forward the route reply packet.

In one embodiment of the present invention, the route request packet comprises a source field, a destination field, a packet sequence number and a road section list, wherein the source field is related to the source node, the destination field is related to the destination node, and the step of each of the relay nodes relaying the route request packet to the destination node comprises the following steps. After receiving the route request packet, each of the relay nodes is configured to determine whether the route request packet has been previously processed by checking the packet sequence number in a route request table. If yes, the first relay node ignores the route request packet; if no, the first relay node records the packet sequence number in the route request table and determines whether the road section list comprises the road section that the route request packet currently reaches. If yes, the relay node geographically forwards the route request packet; if no, the first relay node updates the route request packet by appending the road section that the route request packet currently reaches into the road section list and geographically forwards the route request packet.

In one embodiment of the present invention, each of the relay nodes has a neighbour table configured to record a coordinate, a speed and a moving direction of neighbouring relay nodes, and the step of each of the relay nodes relaying the route request packet to the destination node comprises: when a second relay node other than the first relay node of the specific relay nodes receives the route reply packet, the second relay node updates the route reply packet by appending its neighbour table, and forwards the route reply packet.

In one embodiment of the present invention, the step of obtaining the moving traces of the specific relay nodes according to the route reply packet comprises: the first relay node obtains the moving traces of the specific relay nodes according to the neighbour table corresponding to each of the specific relay nodes.

In one embodiment of the present invention, after the step of the first relay node estimating the at least one connection available interval of the specific road section according to the at least one connection life period, the routing method further comprises: the first relay node removes the neighbour table, which corresponds to each of the specific relay nodes, contained in the route reply packet after estimating the at least one connection available interval of the specific road section. Next, the first relay node appends the neighbour table of the first relay node to the route reply packet.

In one embodiment of the present invention, the routing method further comprises: each of the relay nodes periodically broadcasting a hello message to the neighbouring relay nodes, wherein the hello message comprises the coordinate, the speed and the moving direction of the relay node that sends the hello message, and the neighbouring relay nodes are the relay nodes within a transmission range of the relay node that sends the hello message. After receiving the hello message, each of the relay nodes updates its neighbour table according to the received hello message.

In one embodiment of the present invention, the step of the first relay node estimating the at least one connection life period related to the specific road slots according to the moving traces comprises: the first relay node maps the moving traces of the specific relay nodes into a space-time planar graph, wherein an X-axis of the space-time planar graph is a time axis and a Y-axis of the space-time planar graph corresponds to the specific road slots. Next, the first relay node estimates a plurality of staying intervals that the specific relay nodes stays in each of the specific road slots. For each of the specific road slots, the first relay node projects the corresponding staying intervals to the time axis to find the at least one connection life period related to the specific road slots.

In one embodiment of the present invention, the step of the first relay node estimating the at least one connection available interval of the specific road section according to the at least one connection life period comprises: the first relay node intersects the at least one connection life period to estimate at least one connection available interval of the specific road section.

In one embodiment of the present invention, after the step of the destination node sending the route reply packet to the source node through the relay nodes locating on the at least one transmission path, further comprises: after receiving the route reply packet, the source node dynamically switches to the at least one transmission path for transmitting data packets according to the at least one connection available interval comprised in the received route reply packet.

In one embodiment of the present invention, the routing method further comprises: the destination node periodically sends a route update packet for checking whether the at least one transmission path is valid, and if the at least one transmission path is invalid, the source node re-sends the route request packet to the destination node through the relay nodes for refreshing the at least one transmission path.

Based on the above description, the embodiments of the present invention provide a vehicular communication system and a routing method thereof. By accurately predicting the path connection life periods of the found transmission paths with the information included in the route reply packet, the source node could dynamically switch among the transmission paths without encountering disconnected transmission paths.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
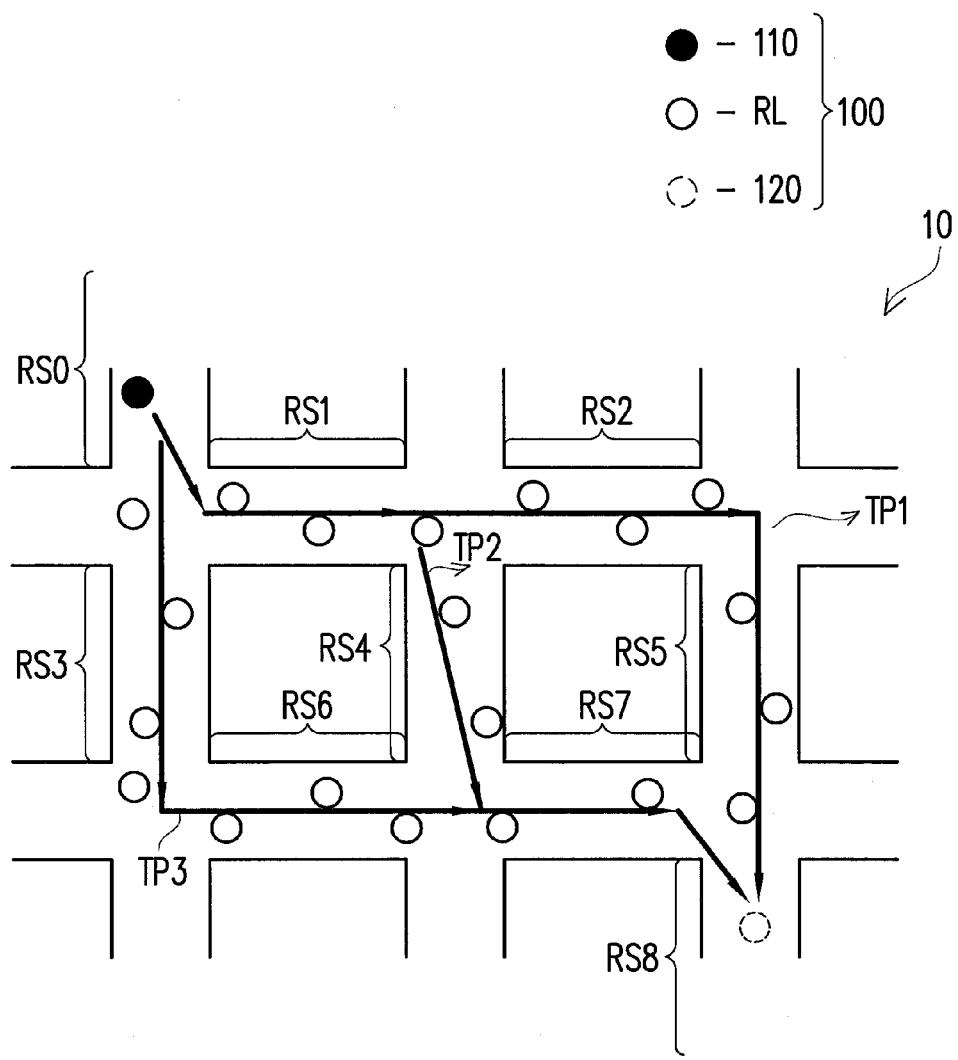
FIG. 1 is a schematic diagram illustrating a vehicular system according to an exemplary embodiment of the present invention.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a schematic diagram illustrating a vehicular system according to an exemplary embodiment of the present invention. In the present embodiment, the vehicular system 100 includes a source node 110, relay nodes RL, and a destination node 120. The vehicular communication system 100 may be deployed in an urban region 10. As exemplarily shown in FIG. 1, the urban region 10 may include road sections RS0-RS8, and there may be blocks between the road sections RS0-RS8. The source node 110, the relay nodes RL and the destination node 120 may respectively be a vehicle, a car, a motorcycle or any kind of mobile device that could directly or indirectly communicate with other mobile devices (e.g., vehicles). Alternatively, the source node 110, the relay node RL and the destination node 120 may respectively be an electronic device disposed on a mobile device (e.g., a vehicle) that could directly or indirectly communicate with other electronic devices disposed on other mobile devices, but the invention is not limited thereto.

In one embodiment of the present invention, the vehicular communication system 100 may be implemented as a vehicular ad hoc network (VANET). That is, each of the nodes (e.g., the source node 110, the relay node RL and the destination node 120) of the vehicular communication system 100 may directly communicate with other nodes through an ad hoc routing protocol, instead of communicating through a base station. Besides, each of the nodes of the vehicular communication system 100 may have a global positioning system (GPS) module, such that each of the nodes is able to know its own coordinate, speed and moving direction from the GPS module.

In some embodiments, each of the relay nodes may have a neighbour table configured to record a coordinate, a speed and a moving direction of neighbouring relay nodes. To be more specific, each of the relay nodes may periodically broadcast a hello message to the neighbouring relay nodes. The hello message may include the coordinate, the speed and the moving direction of the relay node that sends the hello message. The neighbouring relay nodes are the relay nodes within a transmission range of the relay node that sends the hello message. After receiving the hello message, each of the relay nodes RL may update its neighbour table according to the received hello message.

By a routing method proposed in the embodiments of the present invention, the source node 110 may dynamically switch to a transmission path used for transmitting data packets according to accurately predicted connection life periods related to the road sections included in the found transmission paths. Detailed discussion of the routing method is provided in the following paragraphs.

Figure 2:
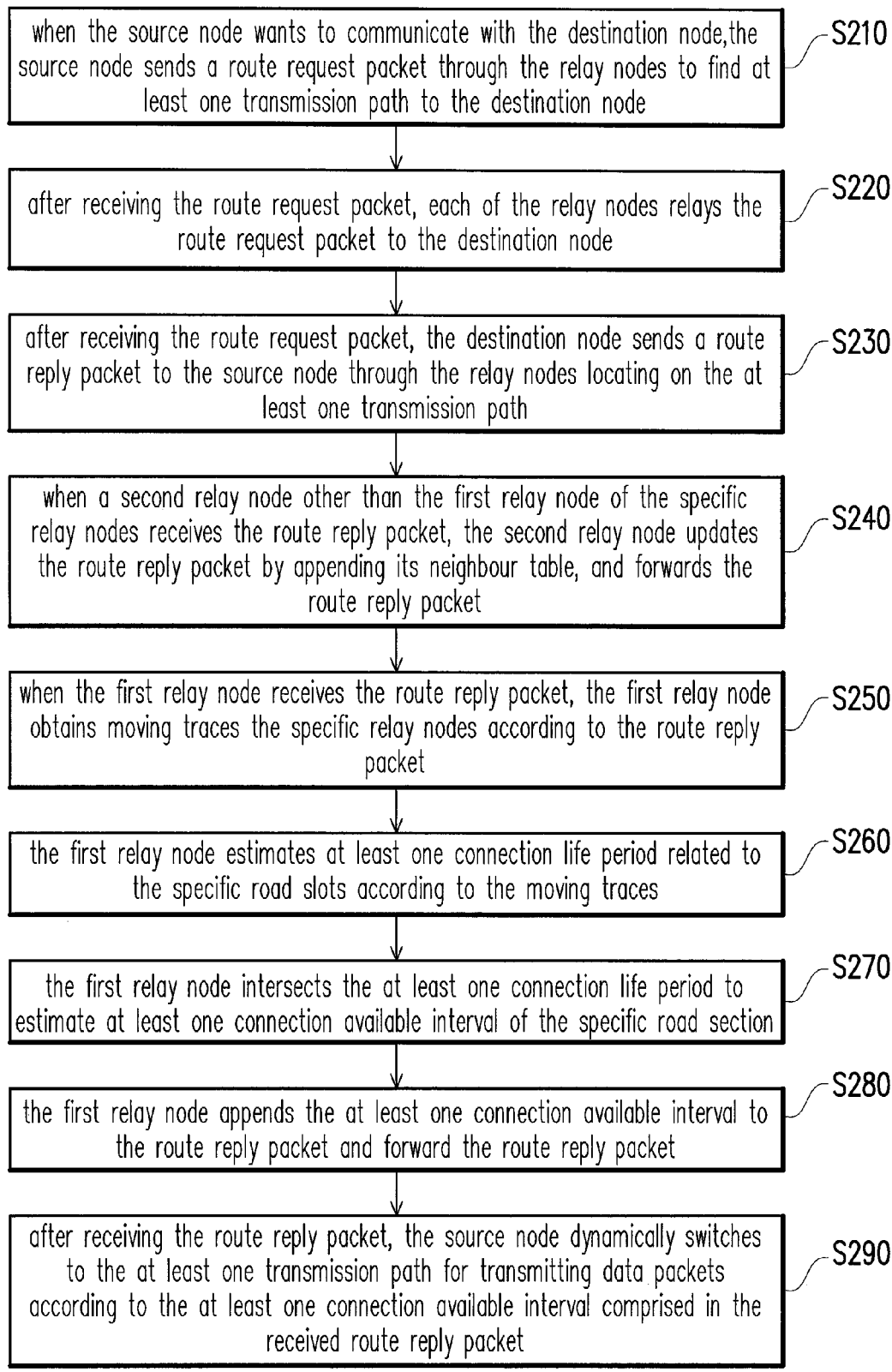
FIG. 2 is a flow chart illustrating the routing method according to an exemplary embodiment of the present invention.

Referring to FIG. 2, FIG. 2 is a flow chart illustrating the routing method according to an exemplary embodiment of the present invention. The routing method illustrated in FIG. 2 could be embodied by the nodes illustrated in FIG. 1, and hence the details of the steps in FIG. 2 would be described along with the nodes illustrated in FIG. 1.

In step S210, when the source node 110 wants to communicate with the destination node 120, the source node 110 may send a route request packet through the relay nodes RL to find at least one transmission path to the destination node 120. Specifically, the source node 110 may broadcast (or flood) the route request packet into the vehicular communication system 100.

In some embodiments, the route request packet may include a source field, a destination field, a packet sequence number and a road section list. The source field may be configured to record the information related to the source node 110, such as the identification of the source node 110 or any other information that could uniquely represent the source node 110. The destination field may be configured to record the information related to the destination node 120, such as the identification of the destination node 120 or any other information that could uniquely represent the destination node 120. The packet sequence number may be the information that could uniquely represent the route request packet, such that the route request packet could be identified by the node that receives the route request packet. The road section list may be configured to record the road sections that the route request packet has passed while being relayed to the destination node 120.

In step S220, after receiving the route request packet, each of the relay nodes RL relays the route request packet to the destination node 120. Note that adjacent relay nodes are within each other's transmission range. Each of the relay nodes RL may be configured to perform some additional operations to prevent repeatedly process the route request packet that has been processed by itself.

Specifically, each of the relay nodes RL may have a route request table configured for recording the packet sequence numbers of every route request packet that has been processed by itself. That is, if the packet sequence number does not exist in the route request table of the relay node that receives the route request packet, this represents that the route request packet has not been processed by the relay node that the route request packet currently reaches. Hereinafter, the relay node that that currently receives and processes the route request packet would be named as a particular relay node for brevity. When the particular relay node receives the route request packet, the particular relay node may firstly determine whether the route request packet has been previously processed by the particular relay node via checking the packet sequence number in its route request table. To be more specific, the particular relay node may check whether the packet sequence number of the route request table is already recorded in the route request table of the particular relay node. If yes, the particular relay node may simply ignore and/or discard the route request packet. If no, the particular relay node may record or add the packet sequence number of the received route request table in the route request table of the particular relay node.

In other embodiments, the particular relay node may further insert or append some information to the route request packet for making the route request packet be able to record every passed road sections. For example, after recording the packet sequence number in the route request table, the particular relay node may further determine whether the road section list of the route request packet includes the road section that the route request packet currently reaches. If yes, the particular relay node may simply geographically forward the route request packet. That is, the particular relay node may forward the route request packet to the relay node that simultaneously satisfies the following conditions: (a) being in the transmission range of the particular relay node and (b) being the relay node that is the farthest from the particular relay node.

On the other hand, if the road section list of the route request packet does not include the road section that the route request packet currently reaches, the particular relay node may update the route request packet by appending (or adding) the road section that the route request packet currently reaches into the road section list. Afterwards, the particular relay node may geographically forward the updated route request packet as well.

As a result, if the route request packet is successfully relayed to the destination node 120, the destination node 120 would be able to find the transmission paths between the source node 110 and the destination node 120 by analyzing the received route request packet. Taking FIG. 1 as an example, if there exists a route request packet that being sequentially relayed by the relay nodes locating in the road sections RS1, RS2 and RS5, the road sections RS1, RS2 and RS5 would be recorded in the road section list of this route request packet, and the destination node 120 would correspondingly know that a transmission path TP1 (which corresponds to the road sections RS1, RS2 and RS5) exists between the source node 110 and the destination node 120.

For another example, if there exists a route request packet that being sequentially relayed by the relay nodes locating in the road sections RS1, RS4 and RS7, the road sections RS1, RS4 and RS7 would be recorded in the road section list of this route request packet, and the destination node 120 would correspondingly know that a transmission path TP2 (which corresponds to the road sections RS1, RS4 and RS7) exists between the source node 110 and the destination node 120. For yet another example, if there exists a route request packet that being sequentially relayed by the relay nodes locating in the road sections RS3, RS6 and RS7, the road sections RS3, RS6 and RS7 would be recorded in the road section list of this route request packet, and the destination node 120 would correspondingly know that a transmission path TP3 (which corresponds to the road sections RS3, RS6 and RS7) exists between the source node 110 and the destination node 120. People with ordinary skills in the art should be able to understand that the transmission paths TP1-TP3 are simply taken as examples, instead of limiting the possible ways of implementing the present invention.

Therefore, in step S230, after receiving the route request packet, the destination node 120 may send a route reply packet to the source node 120 through the relay nodes locating on the transmission paths.

During the process of the route reply packet being relayed back to the source node 110, each of the relay nodes relaying the route reply packet may perform some specific operations to the route reply packet, such that when the source node 110 receives the route reply packet, the source node 110 may intelligently switch the transmission paths used for transmitting data packets. Detailed discussion would be provided hereafter.

Figure 3:
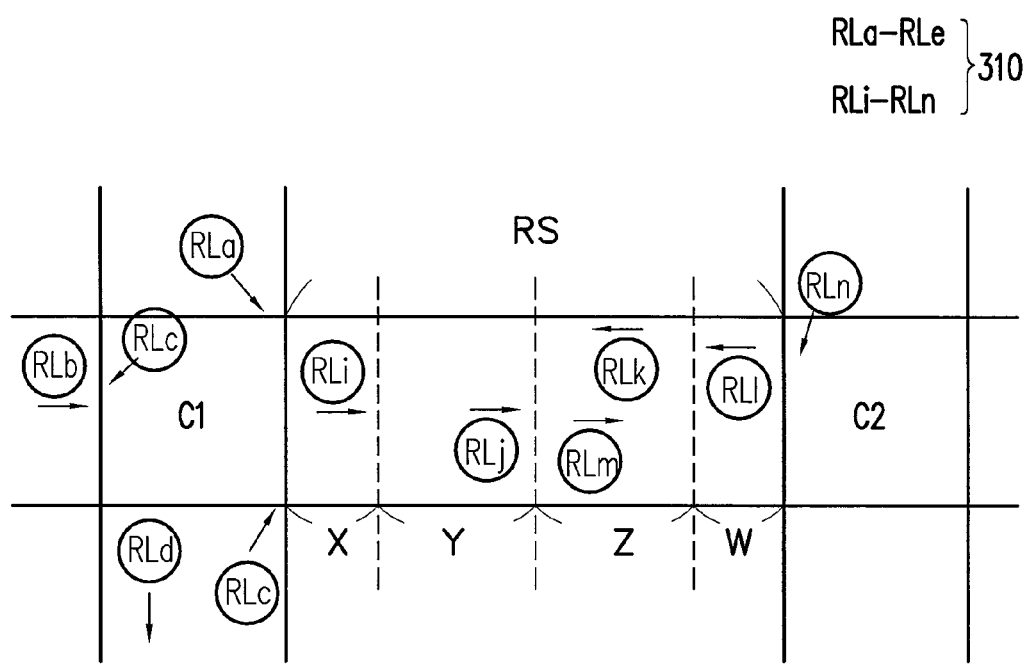
FIG. 3 is a schematic diagram illustrating a map according to an exemplary embodiment of the present invention.

Referring to FIG. 3, FIG. 3 is a schematic diagram illustrating a map according to an exemplary embodiment of the present invention. In the present embodiment, the map 300 may at least include a road section RS and blocks C1-C2. Relay nodes RLa-RLe and RLi, . . . , RLn may be comprised in a vehicular communication system 310, and each of the arrows near the relay nodes RLa-RLe and RLi, . . . , RLn represents the moving direction of its corresponding relay node. The road section RS may include road slots X, Y, Z and W, and the cover ranges of the road slots X, Y, Z and W may be arbitrarily adjusted by the designer of the vehicular communication system 310. Besides, the amount of the road slots included in a road section could also be arbitrarily adjusted by the designer of the vehicular communication system 310.

Referring to FIG. 1 to FIG. 3, it is assumed that each of the relay nodes RLa-RLe and RLi, . . . , RLn is locating on the transmission path that the destination node 120 used to transmit the route reply packet to the source node 110, and each of the relay nodes that helps relay the route reply packet back to the source node 110 (e.g., the relay nodes RLa, RLb, . . . , RLn) could be roughly categorized as a first relay node or a second relay node according to its location. The first relay node may be the relay node that locates in a last road slot of each of the road section, and the second relay node may be the relay nod that is not in the last road slot of each of the road sections. The last road slot may be the road slot that the route reply packet lastly reaches in each of the road sections while being relayed to the source node 110.

Taking FIG. 3 as an example, assuming that the route reply packet currently reaches the road section RS and is being sequentially relayed through the road slots W, Z, Y and X, the road slot X may be regarded as the last road slot of the road section RS. Under this situation, the relay node RLi would be categorized as the first relay node since the relay node RLi is currently locating in the road slot X (i.e., the last road slot of the road section RS). Besides, since the relay nodes RLj, RLk, RLm and RL1 are not in the last road slot (i.e., the road slot X), the relay nodes RLj, RLk, RLm and RL1 may be categorized as the second relay nodes. In some embodiments, after the road slots of each of the road sections are determined by the designer, each of the nodes of the vehicular communication system 100 and 310 could correspondingly determine whether it is categorized as the first relay node or the second relay node according to its coordinate retrieved from its GPS module, but the invention is not limited thereto.

For brevity, the road section that the route reply packet currently reaches may be regarded as a specific road section, the relay nodes that currently locate in the specific road section may be regarded as specific relay nodes, and the road slots included in the specific road section may be regarded as specific road slots. Taking FIG. 3 as an example again, when the route reply packet currently reaches the road section RS, the road section RS could be regarded as the specific road section, the relay nodes RLi, RLj, RLk, RLm and RL1 may be regarded as the specific relay nodes, and the road slots X, Y, Z and W may be regarded as the specific road slots.

Referring back to FIG. 2, in step S240, when a second relay node receives the route reply packet, the second relay node may update the route reply packet by appending its neighbour table. Next, the second relay node may forward the route reply packet. Taking FIG. 3 as an example, when the relay node RLm receives the route reply packet, the relay node RLm may update the route reply packet by appending its neighbour table to the route reply packet. The neighbour table of the relay node RLm may contain the coordinates, speeds and moving directions of, for example, the relay nodes RLj, RLk and RL1. Similarly, when the relay node RLj receives the route reply packet, the relay node RLj may also update the route reply packet by appending its neighbour table to the route reply packet. The neighbour table of the relay node RLj may contain the coordinates, speeds and moving directions of, for example, the relay nodes RLi, RLm, RLk and RL1.

Referring back to FIG. 2, in step S250, when the first relay node receives the route reply packet, the first relay node may obtain moving traces of the specific relay nodes according to the route reply packet. Specifically, the first relay node may obtain the moving traces of the specific relay nodes according to the neighbour table corresponding to each of the specific relay nodes. Since the neighbour tables contained in the route reply packet may be regarded as recording the coordinates, the moving directions and the speeds of the relay nodes neighbouring to the first relay node (e.g., other relay nodes included in the specific relay nodes), the first relay node may accordingly predict the moving traces of the neighbouring relay nodes. Besides, since the first relay has its own neighbour table, which may contain the coordinates, speeds and the moving directions of the relay nodes locating in other road sections.

Taking FIG. 3 as an example, when the relay node RLi (i.e., the first relay node) receives the route reply packet, the relay node RLi could not only obtain (or predict) the moving traces of, for example, the relay nodes RLj-RLn but also the moving traces of, for example, the relay nodes RLa-RLe, as long as the locations of the relay nodes RLa-RLe are within the transmission range of the relay node RLi.

Referring back to FIG. 2, in step S260, the first relay node may estimate at least one connection life period related to a plurality of specific road slots according to the moving traces. In detail, the first relay node may map the moving traces of the specific relay nodes into a space-time planar graph. An X-axis of the space-time planar graph may be a time axis, and a Y-axis of the space-time planar graph may correspond to the specific roads slots. Taking FIG. 3 as an example, the relay node RLi may construct a space-time planar graph as illustrated in FIG. 4.

Figure 4:
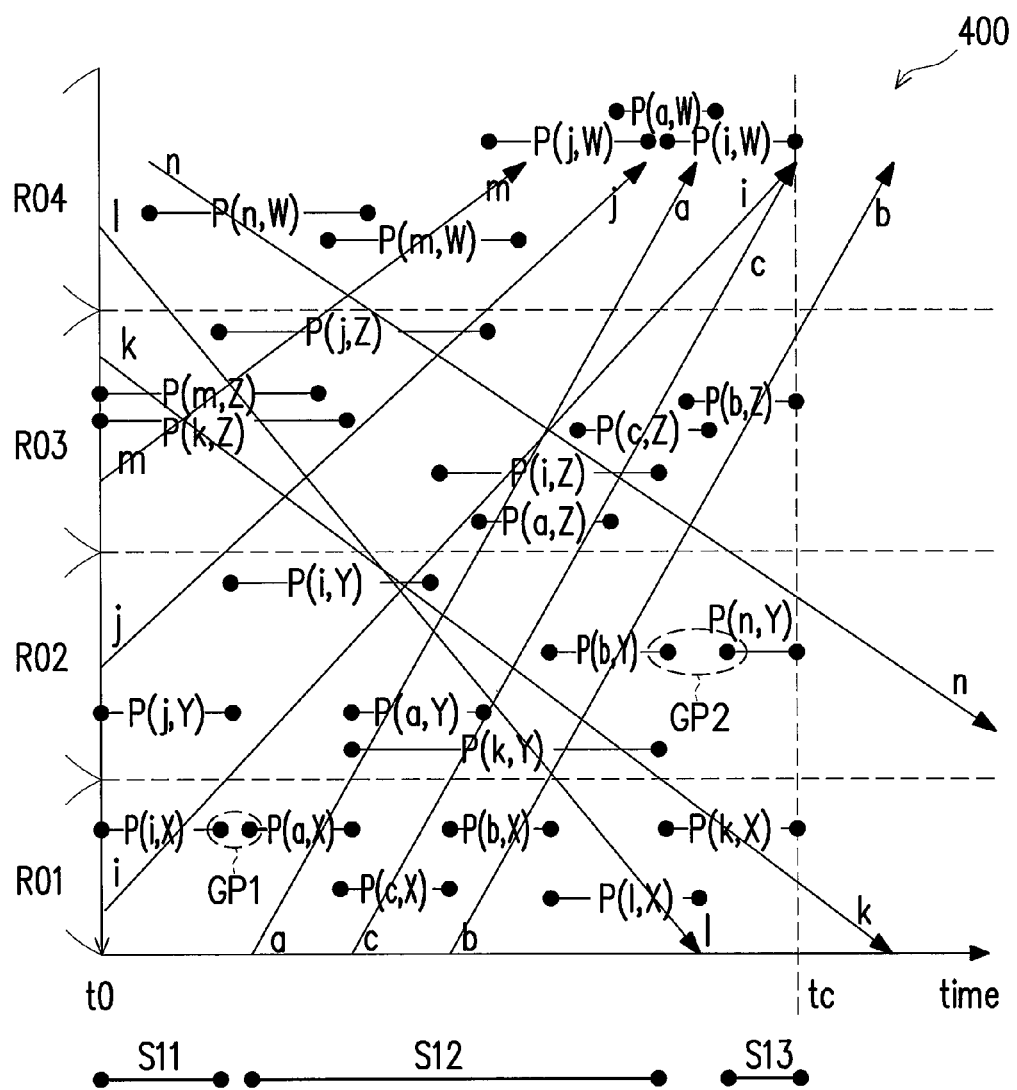
FIG. 4 is a schematic diagram illustrating a space-time planar graph according to FIG. 3.

Referring to FIG. 4, FIG. 4 is a schematic diagram illustrating a space-time planar graph according to FIG. 3. In the present embodiment, each of the arrows shown in a space-time planar graph 400 constructed by the relay node RLi (i.e., the first relay node) represents a moving trace of a relay node. For example, the arrow labeled by "i" represents the moving trace of the relay node RLi, and the arrow labeled by "m" represents the moving trace of the relay node RLm, and so on. As exemplarily shown in FIG. 4, the Y-axis is divided into several sections which respectively correspond to each of the specific road slots (i.e., the road slot X, Y, Z and W). The slope of each of the arrows represents the speed (i.e., the average speed) of the corresponding relay node, and the pointing direction of each of the arrows represents the moving direction of the corresponding relay node.

With the arrows shown in FIG. 4, the relay node RLi may correspondingly estimate the staying intervals that the specific relay nodes stay in each of the specific road slots. For example, the staying intervals (i.e., the horizontal line sections) labeled as P(i, X), P(i, Y), P(i, Z) and P(i, W) respectively represents the intervals that the relay node RLi stays in the road slots X, Y, Z and W. For another example, the staying intervals (i.e., the horizontal line sections) labeled as P(m, X), P(m, Y), P(m, Z) and P(m, W) respectively represents the intervals that the relay node RLm stays in the road slots X, Y, Z and W. As mentioned in the previous embodiments, the neighbour table of the relay node RLi could record the coordinates, speeds and moving directions of the relay nodes RLa-RLe, and hence the relay node RLi may correspondingly map the moving traces of the relay nodes RLa-RLe on the space-time planar graph 400.

From another point of view, if there exists any staying interval within a road slot, this means that there is a relay node staying in the road slot during the staying intervals, and therefore this relay node could help relay packets. That is, the connection life period of the road slot would exist during the existing staying intervals.

In the present embodiment, the relay node RLi may simply observe the activities of the specific relay nodes within an observation interval (e.g., 5 seconds), which may be characterized as a time duration between timing points t0 and tc. The timing point t0 may be the timing point that the relay node RLi (i.e., the first relay node) receives the route reply packet. After the timing point tc, the source node 110 may re-send the route request packet to find new transmission paths to the destination node 120 since the transmission paths may be invalid or disconnected as time goes by.

Afterwards, for each of the specific road slots (i.e., the road slots X, Y, Z and W), the relay node RLi (i.e., the first relay node) may project the corresponding staying intervals to the time axis to find the at least one connection life period related to the specific road slots. Taking the road slot RO3 as an example, the relay node RLi may project the staying intervals corresponding to the road slot RO3 to the time axis of the space-time planar graph 400. To be more specific, the relay node RLi may project the staying intervals P(m, Z), P(k, Z), P(j, Z), P(i, Z), P(a, Z), P(c, Z) and P(b, Z) to the time axis of the space-time planar graph 400. Since the projection of the staying intervals corresponding to the road slot RO3 has no gap, the relay node RLi would know that there would always be at least one relay node in the road slot RO3 that could help relay packets during the observation interval. Therefore, the connection life period related to the road slot RO3 would be the whole observation interval.

Taking the road slot RO1 as another example, the relay node RLi may project the staying intervals corresponding to the road slot RO1 to the time axis of the space-time planar graph 400. To be more specific, the relay node RLi may project the staying intervals P(i, X), P(a, X), P(c, X), P(b, X), P(1, X) and P(k, X) to the time axis of the space-time planar graph 400. Since the projection of the staying intervals corresponding to the road slot RO1 has a gap (corresponding to a space GP1 between the staying intervals P(i, X) and P(a, X)), the relay node RLi would know that during the time duration corresponding to the space GP1, there would not be any relay nodes within the road slot RO1. Therefore, the connection life period related to the road slot RO1 would be the observation interval excluding the time duration corresponding to the space GP1.

As for the road slot RO2, the relay node RLi may project the staying intervals corresponding to the road slot RO2 to the time axis of the space-time planar graph 400. To be more specific, the relay node RLi may project the staying intervals P(j, Y), P(i, Y), P(a, Y), P(k, Y), P(b, Y) and P(n, Y) to the time axis of the space-time planar graph 400. Since the projection of the staying intervals corresponding to the road slot RO2 has a gap (corresponding to a space GP2 between the staying intervals P(b, Y) and P(n, Y)), the relay node RLi would know that during the time duration corresponding to the space GP2, there would not be any relay nodes within the road slot RO2. Therefore, the connection life period related to the road slot RO2 would be the observation interval excluding the time duration corresponding to the space GP2. Furthermore, the relay node RLi may also know the connection life period related to the road slot RO4 according to the aforementioned teachings, which would not be repeated herein.

Referring back to FIG. 2, in step S270, the relay node RLi (i.e., the first relay node) may intersect the at least one connection life period to estimate at least one connection available interval of the specific road section. The intersected connection life periods may be represented by segments S11, S12 and S13. The segments S11, S12 and S13 may be regarded as the the observation interval simultaneously excluding the time durations corresponding to the spaces GP1 and GP2.

In step S280, the relay node RLi (i.e., the first relay node) may append the at least one connection available interval to the route reply packet and forward the route reply packet. In some embodiments, before the relay node RLi (i.e., the first relay node) forward the route reply packet, the relay node RLi may remove the neighbour tables, which correspond to the specific relay nodes, originally contained in the route reply packet. Next, the relay node RLi (i.e., the first relay node) may only append its own neighbour table to the route reply packet, and then forward the route reply packet. As a result, the control overhead included in the route reply packet could be significantly reduced.

Roughly speaking, for each road sections within a particular transmission path, the corresponding first nodes (i.e., the relay node locating in the last road slot of each of the road sections contained in the particular transmission path) may respectively performs the steps S250-S280, such that all of the estimated connection available interval of the road sections within the particular transmission path could be included in the route reply packet.

In step S290, after receiving the route reply packet, the source node 110 may dynamically switch to the at least one transmission path for transmitting data packets according to the at least one connection available interval comprised in the received route reply packet. In detail, the source node 110 may receive many route reply packets corresponding to different transmission paths, and each of the received route reply packets may contain the estimated connection available intervals of the road sections within the corresponding transmission path. Afterwards, for each of the route reply packets, the source node 110 may intersect the corresponding connection available intervals to estimate path connection life periods of each of the transmission paths.

Figure 5:
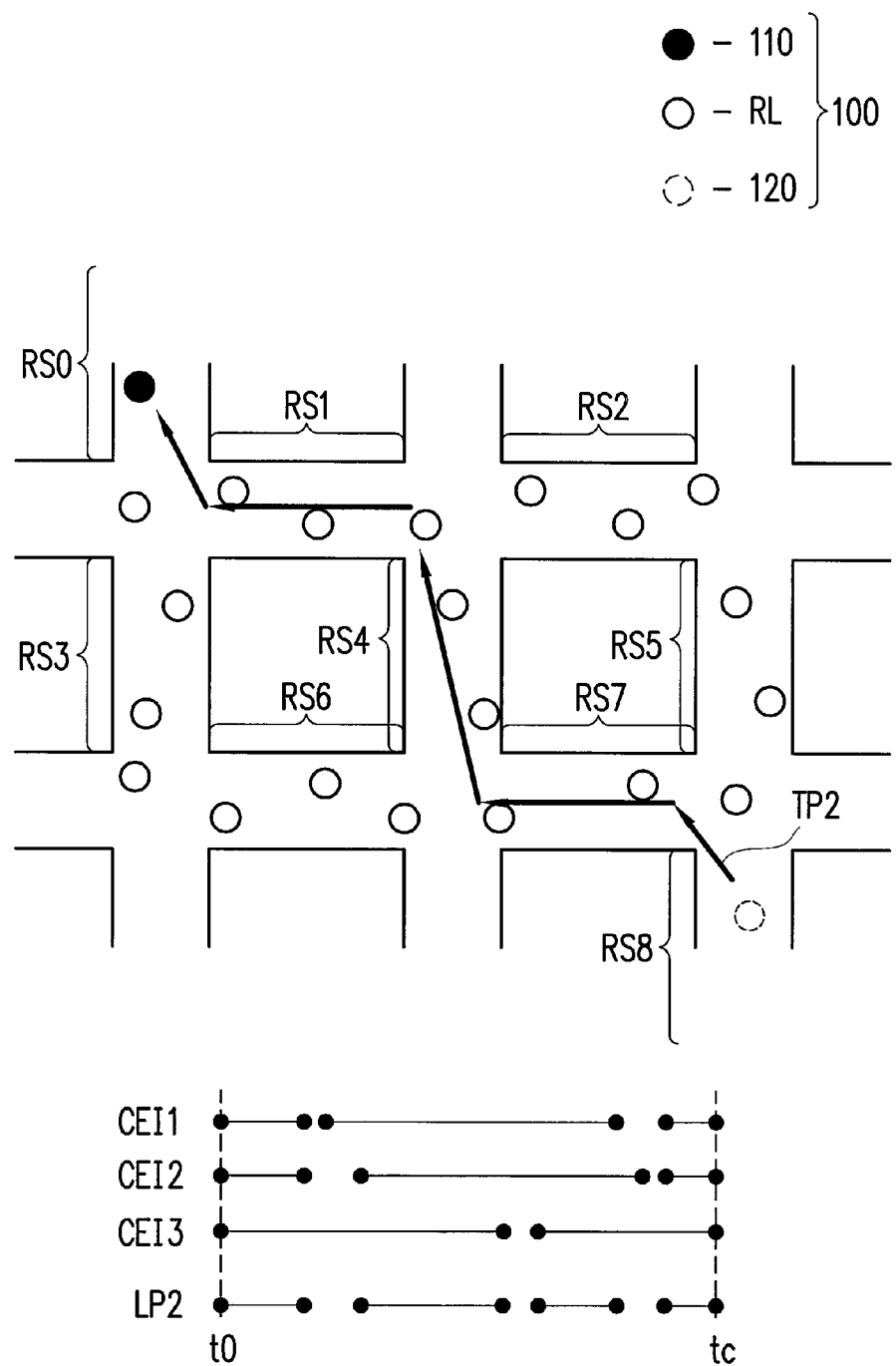
FIG. 5 is a schematic diagram illustrating the map and the estimated connection available intervals of road sections according to FIG. 1.

Referring to FIG. 5, FIG. 5 is a schematic diagram illustrating the map and the estimated connection available intervals of road sections according to FIG. 1. It is assumed that one of the route requests received by the source node 110 is relayed through the transmission path TP2 (including the road sections RS7, RS4 and RS1). Therefore, this route request packet would contain the estimated connection available intervals of road sections RS7, RS4 and RS1. In the present embodiment, the estimated connection available intervals of the road sections RS7, RS4 and RS1 could be represented by connection available intervals CEI1, CEI2 and CEI3. The connection available intervals CEI1-CEI3 could respectively correspond to the road sections RS7, RS4 and RS1. With the connection available intervals CEI1-CEI3, the source node 110 may intersect the connection available intervals CEI1-CEI3 to estimate path connection life periods LP2 of the transmission path TP2. The path connection life periods LP2 may be regarded as the periods that the transmission path TP2 could be used to transmit data packets by the source node 110.

Figure 6:
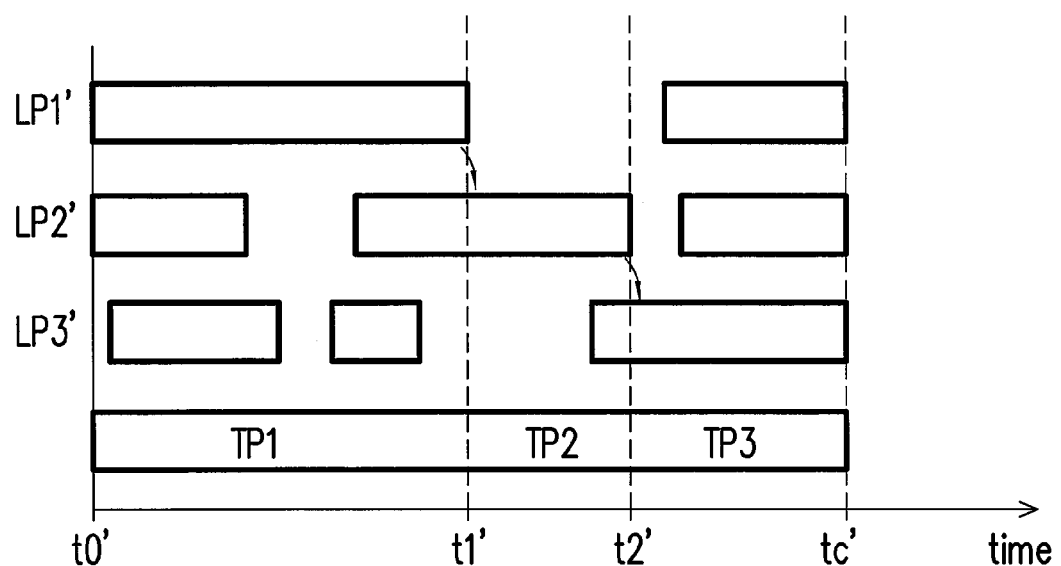
FIG. 6 is a schematic diagram illustrating the path connection life periods of the transmission paths according to FIG. 1.

FIG. 6 is a schematic diagram illustrating the path connection life periods of the transmission paths according to FIG. 1. In the present embodiment, it is assumed that path connection life periods LP1'-LP3' within the observation interval (i.e., the interval between timing points t0' and tc') respectively corresponds to the transmission paths TP1-TP3 of FIG. 1. With the path connection life periods LP1'-LP3', the source node 110 may accordingly switch among the transmission paths TP1-TP3 to transmit data packets.

For example, the source node 110 would know that the transmission path TP1 may be used to transmit data packets between the timing point t0' and the timing point t1' according to the path connection life period LP1'. Hence, the source node 110 may adopt the transmission path TP1 to transmit data packets during the time duration between the timing point t0' and the timing point t1'. Afterwards, the source node 110 may know that the transmission path TP2 may be used to transmit data packets between the timing point t1' and the timing point t2' according to the path connection life period LP2'. Accordingly, the source node 110 may adopt the transmission path TP2 to transmit data packets during the time duration between the timing point t1' and the timing point t2'. Next, the source node 110 may know that the transmission path TP3 may be used to transmit data packets between the timing point t2' and the timing point tc' according to the path connection life period LP3'. Hence, the source node 110 may adopt the transmission path TP3 to transmit data packets during the time duration between the timing point t2' and the timing point tc'.

In some embodiments, the destination node 120 may periodically send a route update packet for checking whether the transmission paths are still valid. If the transmission paths are invalid (i.e., disconnected), the source node 110 may re-send the route request packet to the destination node 120 through the relay nodes for refreshing the transmission paths. That is, when the transmission paths are invalid, the source node 110 may re-send the route request packet to re-discover transmission paths.

Since the proposed routing method could accurately predict the path connection life period of each of the transmission paths, the source node 110 could switch to another transmission path before the current transmission path is about to be disconnected, such that a low packet loss rate could be achieved. In addition, since the source node 110 does not need to frequently wait for the re-discovery of transmission paths, the average packet delivering delay may be correspondingly reduced. From another point of view, since the source node 110 does not need to frequently send the route request packet, which could be regarded as control overhead, the overall control overhead of the proposed routing method is significantly reduced. Moreover, since the proposed routing method could be considered as being designed with a road-based principle, the proposed routing method could be highly suited to be implemented in high mobility urban VANETs.

In other embodiments, since the source node 110 and the destination node 120 may help to relay other nodes' route request packet, the source node 110 and the destination node 120 may perform the aforementioned relaying operations as taught in the previous embodiments, which would not be repeated herein.

To sum up, the embodiments of the present invention provide a vehicular communication system and a routing method thereof. By accurately predicting the path connection life periods of the found transmission paths with the information included in the route reply packet, the source node could dynamically switch among the transmission paths without encountering disconnected transmission paths. Therefore, the routing method could achieve a routing mechanism with low packet loss rate, low packet delivering delay and low control overhead. Moreover, since the proposed routing method is designed with a road-based principle, the proposed routing method could be highly suited to be implemented in high mobility urban VANETs.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A vehicular communication system, comprising:
a source node;
a plurality of relay nodes; and
a destination node,
wherein when the source node wants to communicate with the destination node, the source node sends a route request packet to find at least one transmission path to the destination node, wherein each of the transmission path comprises at least one road section, and each of the road section comprises at least one road slot;
after receiving the route request packet, each of the relay nodes relays the route request packet to the destination node;
after receiving the route request packet, the destination node sends a route reply packet to the source node through the relay nodes locating on the at least one transmission path;
wherein when a first relay node of the relay nodes, which locates in a last road slot of each of the road section, receives the route reply packet, the first relay node is configured to:
obtain a plurality of moving traces of a plurality of specific relay nodes according to the route reply packet, wherein the specific relay nodes comprises the relay nodes currently locating in a specific road section, and the specific road section is the road section that the route reply packet currently reaches;
estimate at least one connection life period related to a plurality of specific road slots according to the moving traces, wherein the specific road slots are the road slots within the specific road section, wherein the first relay node maps the moving traces of the specific relay nodes into a space-time planar graph, estimates a plurality of staying intervals that the specific relay nodes stays in each of the specific road slots, and projects the corresponding staying intervals to a time axis to find the at least one connection life period related to the specific road slots for each of the specific road slots, wherein an X-axis of the space-time planar graph is the time axis and a Y-axis of the space-time planar graph corresponds to the specific road slots;
estimate at least one connection available interval of the specific road section according to the at least one connection life period; and
append the at least one connection available interval to the route reply packet and forward the route reply packet,
wherein the last road slot is the road slot that the route reply packet lastly reaches in each of the road section while being relayed to the source node.

2. The vehicular communication system as claimed in claim 1, wherein the route request packet comprises a source field, a destination field, a packet sequence number and a road section list, wherein the source field is related to the source node, the destination field is related to the destination node,
wherein after receiving the route request packet, each of the relay nodes is configured to:
determine whether the route request packet has been previously processed by checking the packet sequence number in a route request table;
if yes, ignore the route request packet;
if no, record the packet sequence number in the route request table and determine whether the road section list comprises the road section that the route request packet currently reaches;
if yes, geographically forward the route request packet; and
if no, update the route request packet by appending the road section that the route request packet currently reaches into the road section list and geographically forward the route request packet.

3. The vehicular communication system as claimed in claim 1, wherein each of the relay nodes has a neighbour table configured to record a coordinate, a speed and a moving direction of neighbouring relay nodes,
wherein when a second relay node other than the first relay node of the specific relay nodes receives the route reply packet, the second relay node updates the route reply packet by appending its neighbour table, and forwards the route reply packet.

4. The vehicular communication system as claimed in claim 3, wherein the first relay node obtain the moving traces of the specific relay nodes according to the neighbour table corresponding to each of the specific relay nodes.

5. The vehicular communication system as claimed in claim 4, wherein the first relay node is further configured to:
remove the neighbour table, which corresponds to each of the specific relay nodes, contained in the route reply packet after estimating the at least one connection available interval of the specific road section; and
append the neighbour table of the first relay node to the route reply packet.

6. The vehicular communication system as claimed in claim 3, wherein each of the relay nodes periodically broadcasts a hello message to the neighbouring relay nodes, wherein the hello message comprises the coordinate, the speed and the moving direction of the relay node that sends the hello message, and the neighbouring relay nodes are the relay nodes within a transmission range of the relay node that sends the hello message,
wherein after receiving the hello message, each of the relay nodes updates its neighbour table according to the received hello message.

7. The vehicular communication system as claimed in claim 1, wherein the first relay node intersects the at least one connection life period to estimate at least one connection available interval of the specific road section.

8. The vehicular communication system as claimed in claim 1, wherein after receiving the route reply packet, the source node dynamically switches to the at least one transmission path for transmitting data packets according to the at least one connection available interval comprised in the received route reply packet.

9. The vehicular communication system as claimed in claim 1, wherein the destination node periodically sends a route update packet for checking whether the at least one transmission path is valid, and if the at least one transmission path is invalid, the source node re-sends the route request packet to the destination node through the relay nodes for refreshing the at least one transmission path.

10. A routing method, adapted to a vehicular communication system that comprises a source node, a plurality of relay nodes and a destination node, comprising:
when the source node wants to communicate with the destination node, the source node sends a route request packet to find at least one transmission path to the destination node, wherein each of the transmission path comprises at least one road section, and each of the road section comprises at least one road slot;
after receiving the route request packet, each of the relay nodes relays the route request packet to the destination node;
after receiving the route request packet, the destination node sends a route reply packet to the source node through the relay nodes locating on the at least one transmission path;
wherein when a first relay node of the relay nodes, which locates in a last road slot of each of the road section, receives the route reply packet, the first relay node is configured to:
obtain a plurality of moving traces of a plurality of specific relay nodes according to the route reply packet, wherein the specific relay nodes comprises the relay nodes currently locating in a specific road section, and the specific road section is the road section that the route reply packet currently reaches;
estimate at least one connection life period related to a plurality of specific road slots according to the moving traces, wherein the specific road slots are the road slots within the specific road section, wherein the first relay node maps the moving traces of the specific relay nodes into a space-time planar graph, estimates a plurality of staying intervals that the specific relay nodes stays in each of the specific road slots, and projects the corresponding staying intervals to a time axis to find the at least one connection life period related to the specific road slots for each of the specific road slots, wherein an X-axis of the space-time planar graph is the time axis and a Y-axis of the space-time planar graph corresponds to the specific road slots;
estimate at least one connection available interval of the specific road section according to the at least one connection life period; and
append the at least one connection available interval to the route reply packet and forward the route reply packet.

11. The routing method as claimed in claim 10, wherein the route request packet comprises a source field, a destination field, a packet sequence number and a road section list, wherein the source field is related to the source node, the destination field is related to the destination node, and the step of each of the relay nodes relaying the route request packet to the destination node comprising:
after receiving the route request packet, each of the relay nodes is configured to:
determine whether the route request packet has been previously processed by checking the packet sequence number in a route request table;
if yes, ignore the route request packet;
if no, record the packet sequence number in the route request table and determine whether the road section list comprises the road section that the route request packet currently reaches;
if yes, geographically forward the route request packet; and
if no, update the route request packet by appending the road section that the route request packet currently reaches into the road section list and geographically forward the route request packet.

12. The routing method as claimed in claim 10, wherein each of the relay nodes has a neighbour table configured to record a coordinate, a speed and a moving direction of neighbouring relay nodes, and the step of each of the relay nodes relaying the route request packet to the destination node comprising:
when a second relay node other than the first relay node of the specific relay nodes receives the route reply packet, the second relay node updates the route reply packet by appending its neighbour table, and forwards the route reply packet.

13. The routing method as claimed in claim 12, wherein the step of obtaining the moving traces of the specific relay nodes according to the route reply packet comprising:
the first relay node obtains the moving traces of the specific relay nodes according to the neighbour table corresponding to each of the specific relay nodes.

14. The routing method as claimed in claim 13, wherein after the step of the first relay node estimating the at least one connection available interval of the specific road section according to the at least one connection life period, further comprising:

the first relay node removes the neighbour table, which corresponds to each of the specific relay nodes, contained in the route reply packet after estimating the at least one connection available interval of the specific road section; and the first relay node appends the neighbour table of the first relay node to the route reply packet.

15. The routing method as claimed in claim 12, further comprising:

each of the relay nodes periodically broadcasting a hello message to the neighbouring relay nodes, wherein the hello message comprises the coordinate, the speed and the moving direction of the relay node that sends the hello message, and the neighbouring relay nodes are the relay nodes within a transmission range of the relay node that sends the hello message, wherein after receiving the hello message, each of the relay nodes updates its neighbour table according to the received hello message.

16. The routing method as claimed in claim 10, wherein the step of the first relay node estimating the at least one connection available interval of the specific road section according to the at least one connection life period comprising:

the first relay node intersects the at least one connection life period to estimate at least one connection available interval of the specific road section.

17. The routing method as claimed in claim 10, wherein after the step of the destination node sending the route reply packet to the source node through the relay nodes locating on the at least one transmission path, further comprising:

after receiving the route reply packet, the source node dynamically switches to the at least one transmission path for transmitting data packets according to the at least one connection available interval comprised in the received route reply packet.

18. The routing method as claimed in claim 10, further comprising:

the destination node periodically sending a route update packet for checking whether the at least one transmission path is valid, and if the at least one transmission path is invalid, the source node re-sends the route request packet to the destination node through the relay nodes for refreshing the at least one transmission path.

* * * * *